April 22, 1952     F. D. JOHNSON     2,594,174
HAND BRUSH FOR TENDERIZING MEAT
Filed Sept. 21, 1948     3 Sheets-Sheet 1
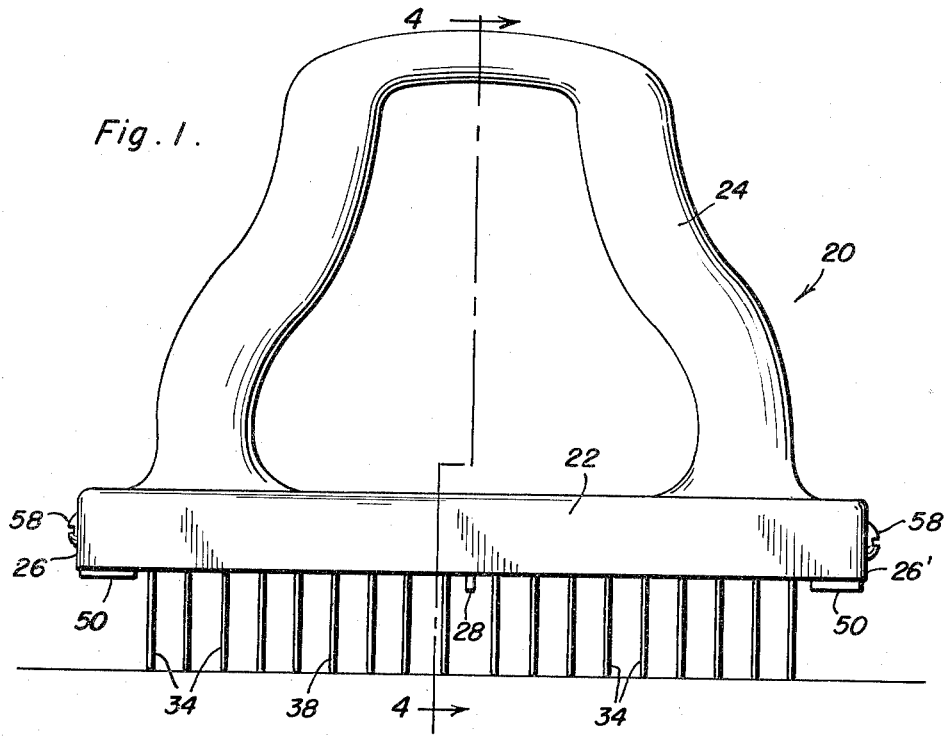
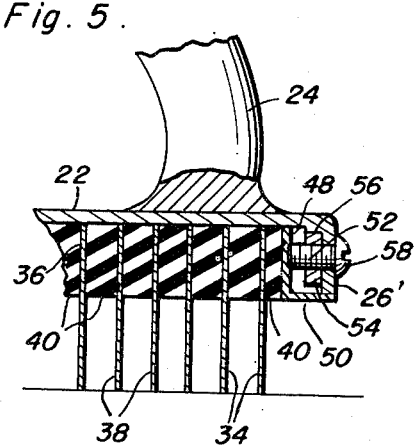
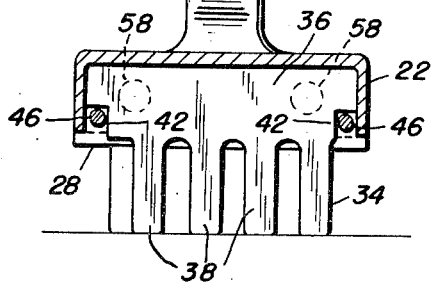
Franklin D. Johnson
INVENTOR.

April 22, 1952     F. D. JOHNSON     2,594,174
HAND BRUSH FOR TENDERIZING MEAT
Filed Sept. 21, 1948     3 Sheets-Sheet 2
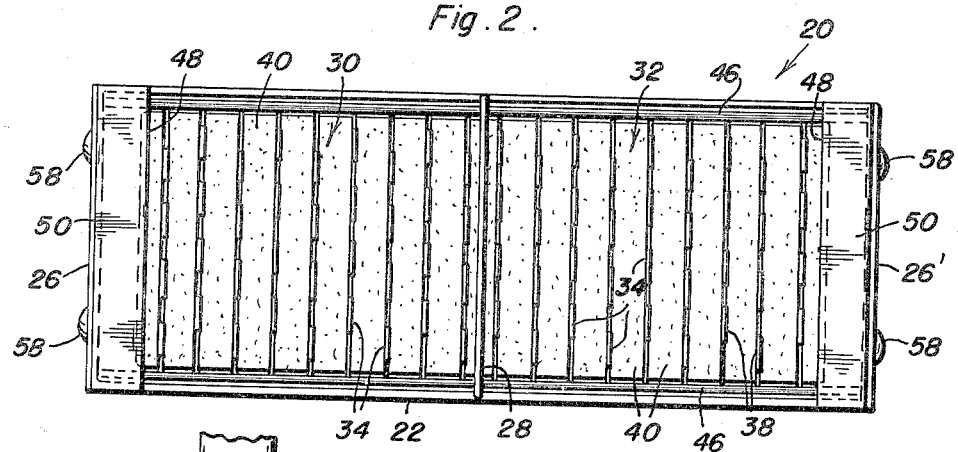
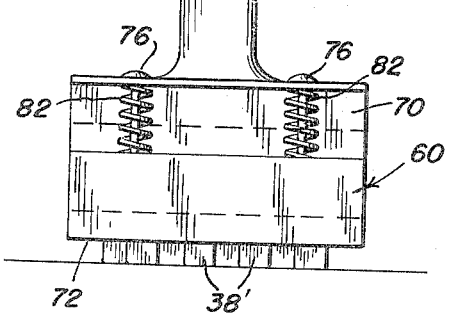
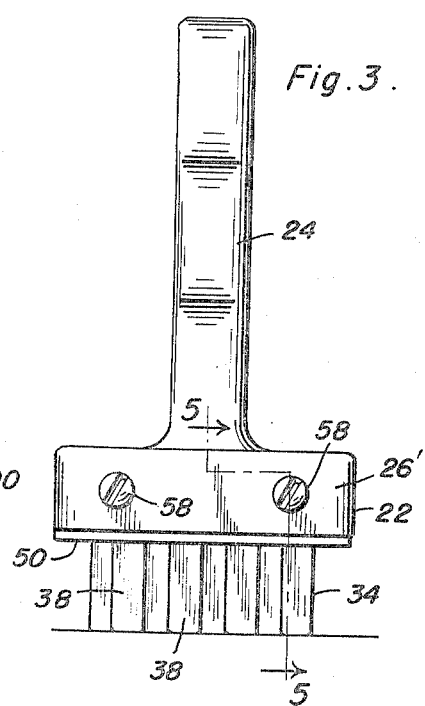
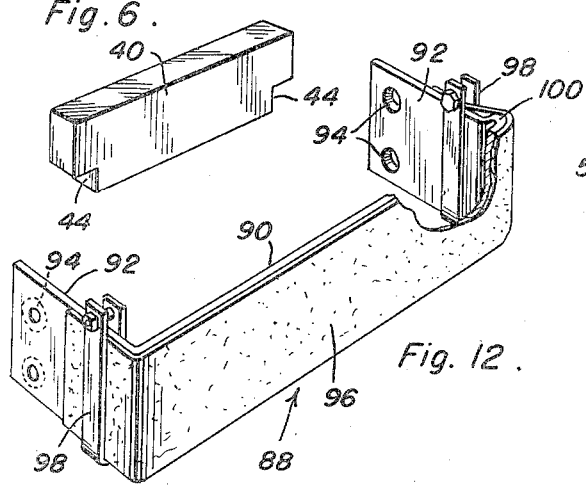
Franklin D. Johnson
INVENTOR.

April 22, 1952   F. D. JOHNSON   2,594,174
HAND BRUSH FOR TENDERIZING MEAT
Filed Sept. 21, 1948   3 Sheets-Sheet 3
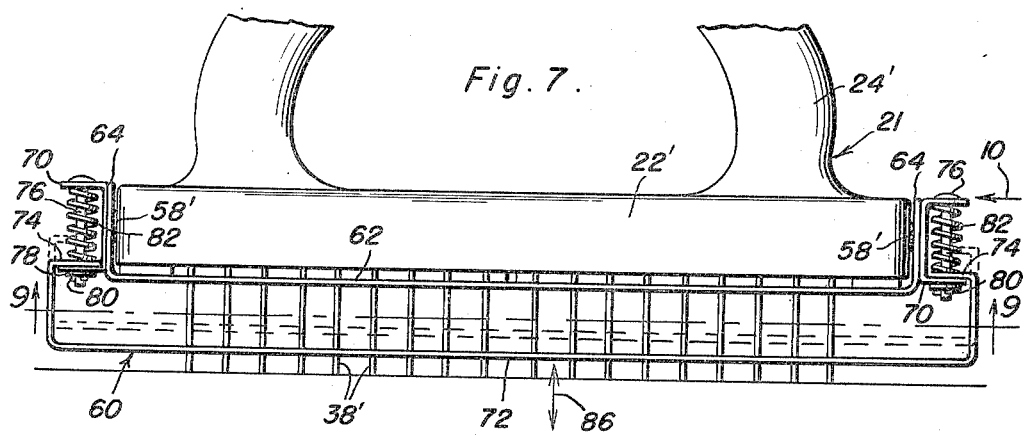
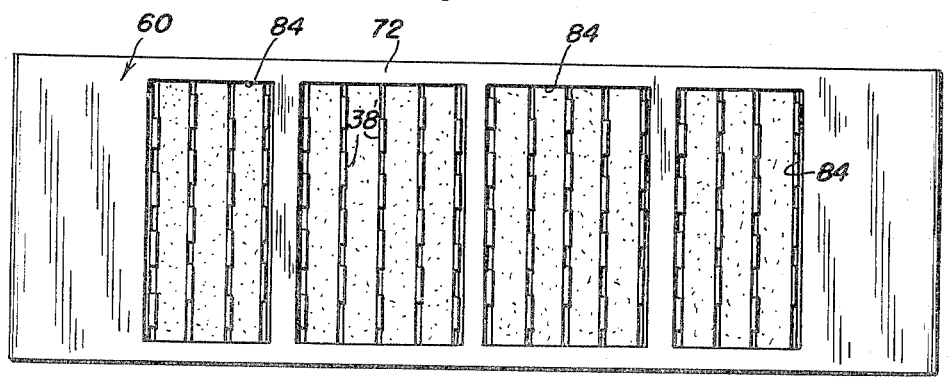
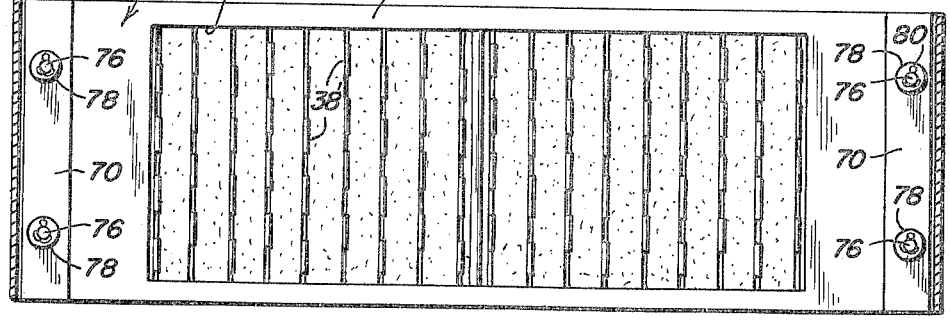
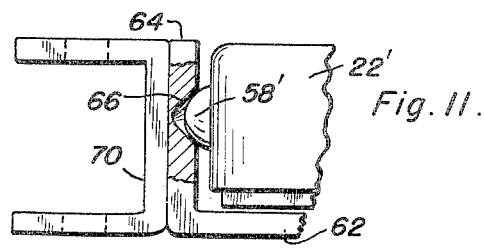
Franklin D. Johnson
INVENTOR.

Patented Apr. 22, 1952

2,594,174

UNITED STATES PATENT OFFICE 2,594,174

HAND BRUSH FOR TENDERIZING MEAT

Franklin D. Johnson, Battle Creek, Mich.

Application September 21, 1948, Serial No. 50,347

1 Claim. (Cl. 17—30)

This invention relates to new and useful improvements and structural refinements in brushes, more particularly, hand brushes such as are commonly employed for scraping or cleaning meat blocks, or the like, and the principal object of the invention is to provide a brush which will conveniently and expeditiously perform such cleaning or scraping operation and which may be employed with equal advantages for other scraping or scrubbing purposes.

This object is achieved by the provision of a brush including a set of brush members firmly clamped between resilient spacer blocks and provided with projecting brush fingers, and an important feature of the invention resides in the provision of means for retaining and clamping the brush members in position.

Another feature of the invention lies in the provision of an attachment for the brush whereby the latter may be effectively employed for "tenderizing" meat, this attachment involving the provision of what may be referred to as a depressible ejecting plate which, after the fingers of the brush are embedded in the meat, tends to disengage or eject the meat therefrom.

Another feature of the invention resides in the provision of a sanding attachment for the brush, such as will be found of convenience particularly when the invention is used by carpenters or painters for scraping and smoothing woodwork.

Important advantages of the invention reside in its simplicity of construction, in its convenience in use, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a side elevational view of the invention;

Figure 2 is an underside plan view thereof;

Figure 3 is an end view of the same;

Figure 4 is a cross sectional view, taken substantially in the plane of the line 4—4 in Figure 1;

Figure 5 is a cross sectional view, on an enlarged scale, taken substantially in the plane of the line 5—5 in Figure 3;

Figure 6 is a perspective view of one of the resilient spacers used in the invention;

Figure 7 is a fragmentary side elevational view showing the brush in association with the ejecting attachment which facilitates the use of the brush as a meat tenderizer;

Figure 8 is an underside plan view of the subject shown in Figure 7;

Figure 9 is a cross sectional view, taken substantially in the plane of the line 9—9 in Figure 7;

Figure 10 is a fragmentary end view, taken substantially in the direction of the arrow 10 in Figure 7;

Figure 11 is a fragmentary elevational view, on an enlarged scale, partially broken away, showing the attachment of the ejector to the holder portion of the brush, and;

Figure 12 is a perspective view, partially broken away, illustrating a sanding attachment for use in association with the brush.

Like characters of reference are employed to designate like parts in the specification and throughout the several views.

Referring now to the accompanying drawings in detail, more particularly to Figures 1–6 inclusively, the invention consists of a hand brush designated generally by the reference character 20, the same embodying in its construction what may be referred to as an elongated box-like holder 22 having a substantially U-shaped cross sectional configuration, this holder being inverted and being provided on the upper surface thereof with a suitable handle 24, as illustrated in Figure 1.

The holder 22 includes a pair of end walls 26, 26' and a transverse partition 28 which separates the holder into a pair of compartments indicated at 30, 32 in Figure 2.

Sets of mutually spaced brush members 34 are positioned in the compartments 30, 32 of the holder 22, each of these brush members including what may be referred to as a plate-like base portion 36 and a set of outwardly projecting fingers 38. (See Figure 4).

Sets of spacer blocks 40, formed from resilient material such as hard rubber, or the like, are interposed between the base portions 36 of the brush members 34, the base portions 36 of the brush members as well as the blocks 40 being provided at the sides thereof with aligned recesses 42, 44 respectively, as is best shown in Figures 4 and 6.

A pair of removable keeper rods 46 extend through the afore-mentioned partition 28 and are disposed in the recesses 42, 44 of the respective members 34 and blocks 40, whereby the members and blocks are removably retained in position in the compartments 30, 32 of the holder 22, as will be clearly apparent.

Each of a pair of L-shaped pressure bars 48 is positioned in one of the compartments 30, 32, these pressure bars being positioned between the end walls 26 and the adjacent spacer blocks 40 in each set, and it is to be noted that the bars 48 include outwardly angulated flanges 50 which overlap outer edges of the end walls 26, as is best shown in Figure 5. Suitable clamping screws 52 extend inwardly through the end walls 26 and are adapted to exert pressure against the bars 48, thereby forcing the bush members 34 and the spacers 40 against the partition 28 and clamping the brush members in an operative position. As already stated, the fingers 38 of the brush members 34 are somewhat resilient, which feature, together with the resilient mounting of the brush members as afforded by the spacer blocks 40, assures firm yet sufficiently flexible mounting of the brush members, so that scraping or scrubbing operations may be conveniently and expeditiously effected.

As is best shown in Figure 5, the clamping screws 52 engage suitable nuts 54 which, in turn, engage retaining ledges 56 formed in the holder 22 for the purpose of preventing the nuts 54 from rotating while the screws 52 are being turned. It is to be also noted that the flanges 50 of the bars 48 protectively cover the spaces occupied by the screws 52 and the nuts 54 in the end portions of the holder, so that when the screws 52 are tightened and the brush members 34 firmly clamped particles of foreign matter such as may be scraped or scrubbed by the brush are prevented from becoming lodged in the holder, as will be clearly apparent.

However, by simply loosening the screws 52 and withdrawing the keeper rods 46 from the partition 28, the brush members 34 together with the spacer blocks 40 may be removed from the holder 22 for purposes of individual cleaning, inspection or replacement.

It is to be noted that the screws 52 are provided with convex heads 58 disposed on the outer surfaces of the end walls 26, the functional utility afforded by the convex heads being hereinafter described.

Referring now to the accompanying Figures 7–11 inclusively, the same illustrate the hand brush 21 in association with an attachment 60 which facilitates the use of the hand brush for tenderizing meat. The brush 21 is substantially the same as the aforementioned brush 20.

This attachment embodies in its construction what may be referred to as a stationary plate 62 formed with angulated end portion 64 which, in turn, are provided with concave or frustoconical depressions 66 (see Figure 11) to receive in a "snap-on" fashion the convex heads 58' of the aforementioned screws 52.

In this manner, the stationary plate 62 is removably attachable to the holder 22', and it will be noted that the plate 62 is formed with an elongated opening 68 through which the fingers 38' may project outwardly, as shown in Figure 9.

A pair of U-shaped channels 70 are secured by welding, or the like to the end portions 64 of the plate 62, and an ejector plate 72 is slidable upwardly relative to the channels 70, as will be presently described. The end portions of the plate 72 are U-shaped as is best shown in Figure 7, terminating in inturned flanges 74 through which extend suitable bolts or pins 76. These pins are journalled in the channels 70 and are retained in position therein by suitable washers and cotters 78, 80 respectively, the flanges 74 of the plate 72 being slidable on the pins 76, as will be clearly apparent. Suitable compression springs 82 are also positioned on the pins 76 between the upper portions of the channels 70 and the flanges 74, and the plate 72 is provided with a plurality of openings 84 to accommodate the outwardly projecting fingers 38', as shown in Figure 8.

It will be apparent from the foregoing that the ejector plate 72 is reciprocable longitudinally with respect to the fingers 38', that is, as indicated by the arrows 86 in Figure 7, so that when the invention is placed in use for tenderizing meat, the fingers 38', by downward pressure upon the handle 24', will be forced into the meat while the plate 72 is pressed upwardly by the meat against the resiliency of the springs 82. Thereupon, when pressure upon the handle 24' is relieved, the springs 82 will urge the plate 72 downwardly, thus assisting to free the fingers 38' from the meat, as will be clearly apparent.

It may be explained at this point that the set of fingers 38 on the various members 34 may be staggered, substantially as shown in Figure 4.

Referring now to the accompanying Figure 12, the same illustrates the sanding attachment designated generally by the reference character 88, such as may be conveniently used in association with the hand brush 20 for the purpose of smoothing or finishing the surface scrubbed or cleaned by the brush members 34.

The attachment 88 embodies in its construction a supporting plate 90 formed with angulated end portions 92 which, in turn, are formed with sets of depressions 94 to removably receive the screw heads 58, the end portions 92 of the plate 90 being sufficiently long so that when the attachment is applied to the brush 20, the intermediate portion of the plate 90 is disposed below the outer ends of the fingers 38.

A sheet or strip of sandpaper, emery cloth, or other abrasively coated material is positionable on the plate 90 as indicated at 96, end portions of the sheet 96 being folded upon the end portions 92 of the plate 90 and being clamped in position thereon by means of suitable, U-shaped clamps 98, substantially as shown. In this manner, the sheet 96 will be firmly retained in position, but by simply loosening the clamps 98, the sheet 96 may be readily removed for purposes of replacement, when necessary.

It is to be noted that the plate 90 is provided with a doubled portion 100 which extends beyond the adjacent end portion 92 of the plate, this doubled portion 100, being covered with the abrasive sheet 96, permitting the sander to reach into poorly accessible locations such as corners, or the like.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

In a hand brush, the combination of an elongated holder having an inverted U-shaped cross-section and including end walls and a transverse partition defining a pair of compartments in the holder, sets of mutually spaced brush members positioned in said compartments and each including a plate-shaped base portion and a plurality of downwardly projecting resilient fingers, sets of resilient spacer blocks provided in said compartments between the base portions of said brush members, a pair of removable keeper rods extending longitudinally of said holder through said partition under said spacer blocks and base portions of said brush members to retain the same in said compartments, substantially L-shaped pressure bars positioned in the compartments between the respective end walls and the adjacent spacer blocks in each set, clamping screws having convex heads disposed at the outside of said end walls, said screws extending through the end walls and engaging said pressure bars to urge the brush members and spacer blocks in said compartments against the opposite sides of said partition, a stationary plate disposed under said holder and having upwardly angulated end portions formed with depressions affording seats for the convex heads of said screws whereby to removably attach said plate to said holder, said plate being provided with openings having said fingers projecting downwardly therethrough, a perforated ejecting plate reciprocable on said fingers below the stationary plate, U-shaped brackets secured to the upwardly angulated end portions of the stationary plate, vertical pins in said brackets, upwardly and inwardly angulated ears provided at the ends of the ejecting plate and slidable on said pins, and compression springs positioned on said pins and bearing downwardly on said ears to urge the ejecting plate downwardly from the stationary plate.

FRANKLIN D. JOHNSON.

REFERENCES CITED

The following references are of record in the file of this patent:

UNITED STATES PATENTS

| Number | Name | Date |
|---|---|---|
| Re. 17,446 | Adams | Mar. 12, 1926 |
| 508,953 | Lavigne | Nov. 21, 1893 |
| 1,173,453 | Miller | Feb. 29, 1916 |
| 1,234,977 | Veeck | July 31, 1917 |
| 1,618,742 | Adams | Mar. 12, 1926 |
| 2,112,297 | McGoldrick | Mar. 29, 1938 |
| 2,140,160 | Little | Dec. 13, 1938 |
| 2,184,450 | Elliott | Dec. 26, 1939 |
| 2,392,036 | Fleming | Jan. 1, 1946 |
| 2,434,356 | Finkelstein | July 27, 1946 |
| 2,438,977 | Rosemeyer | May 16, 1947 |

FOREIGN PATENTS

| Number | Country | Date |
|---|---|---|
| 179,394 | Switzerland | Sept. 15, 1935 |